Figure 1:
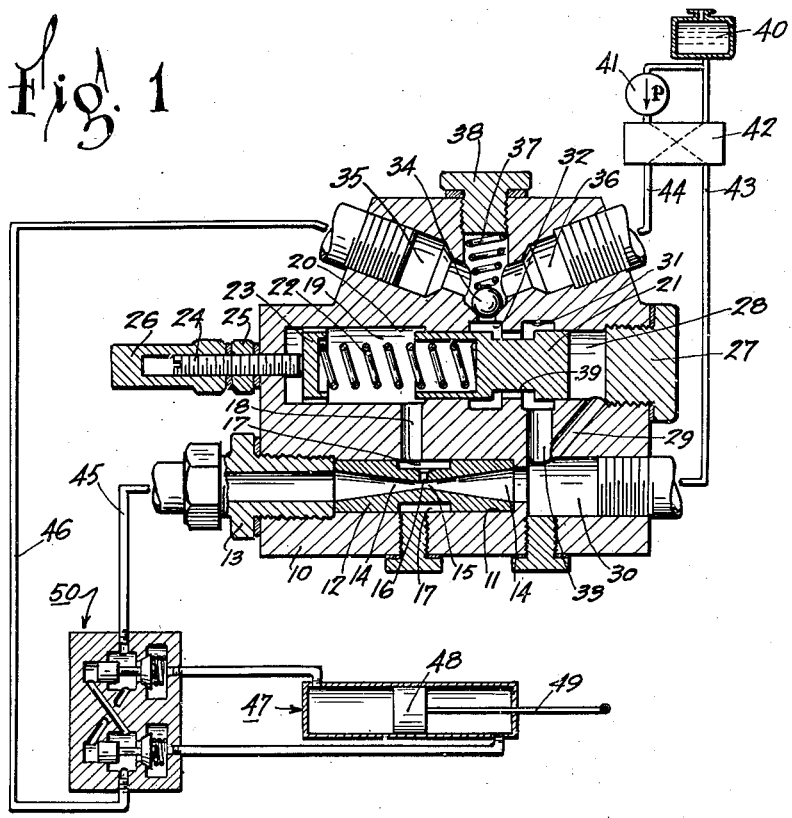

Oct. 29, 1940.  S. M. PARKER  2,219,488

LIQUID PRESSURE REMOTE CONTROL SYSTEM

Filed Nov. 1, 1939

INVENTOR.
SYDNEY MACDONALD PARKER
BY Jerome R. Cox.
ATTORNEY.

Patented Oct. 29, 1940

2,219,488

UNITED STATES PATENT OFFICE 2,219,488

LIQUID PRESSURE REMOTE CONTROL SYSTEM

Sydney Macdonald Parker, London, England, assignor to Automotive Products Company Limited, London, England Application November 1, 1939, Serial No. 302,446
In Great Britain October 25, 1938

7 Claims. (Cl. 103—42)

This invention relates to liquid pressure remote control systems, and particularly to those of the kind in which the source of pressure liquid comprises a continuously running pump, the operation of the slave unit or units being controlled by a selector valve or the equivalent.

In certain cases, principally when the remote control systems are used on vehicles, aircraft and water craft, the pump is driven from the engine of the vehicle or craft with the result that the speed of the pump and consequently the output therefrom is liable to vary within wide limits, depending upon the conditions under which the vehicle or craft happens to be travelling. It follows, therefore, that if a slave unit and the associated parts of the remote control system are designed to work at the desired rate when the engine speed is high, said slave unit will operate sluggishly when the engine is slowed down; similarly if it is so designed as to work properly when the engine is running slowly the movement of said slave unit will be far too rapid when the engine is running fast. It is the primary object of the present invention to provide a relatively simple form of valve device which can be interposed between the pump and the slave unit of a liquid pressure remote control system with a view to limiting the speed of operation of said slave unit and thus enable the remote control system to be so designed that it will operate satisfactorily at low engine speeds as well as at high speeds.

In a liquid pressure remote control system having a source of pressure liquid the available delivery of which varies from time to time, in accordance with the present invention a by-pass valve is provided which is operated by the liquid from said source and is arranged to limit the rate at which liquid is delivered to the slave unit or units of the system when the output from the source is relatively high. Further, in a liquid pressure remote control system comprising a pump arranged to deliver pressure liquid to a double-acting slave unit through either one of a pair of pipe lines, the present invention is characterized by the provision of a by-pass valve device which is actuated by the pressure of the liquid so as to return a part thereof to the inlet of the pump when the rate of delivery from the pump exceeds a predetermined value, so as to reduce the rate of movement of the slave unit when the pump is delivering at a relatively high rate. This may be accomplished by causing the pump to deliver pressure liquid to the slave unit through the medium of a Venturi-shaped passage, and providing a by-pass valve device which is actuated as a result of the pressure drop produced at the throat portion of the Venturi-shaped passage so as to permit a part of the pump output to be returned to the inlet of said pump, and/or to a reservoir for liquid, when the rate of delivery exceeds a predetermined value.

Preferably the by-pass valve device comprises a piston valve member which is axially slidable within a bore in the valve body and is moved to its "open" position by the pressure of the liquid being delivered to the slave unit or units, said valve device conveniently having a spring which tends to close it. Thus the by-pass valve may comprise a piston valve member which is axially slidable within a bore having both ends closed to form working spaces, one of said spaces being connected with the throat portion of the Venturi-shaped passage and the other with the delivery passage of the pump between the latter and the Venturi-shaped passage. Both ends of the valve member subject to liquid pressure may be equal in area and a coiled compression spring may be disposed within that working space connected with the throat portion of the Venturi-shaped passage so that it normally holds the valve member in its closed position, the drop in pressure at the throat portion of the Venturi-shaped passage necessary to open the valve thus being entirely dependent upon the force exerted by the spring. The piston valve member can be of the form having a circumferential groove adapted to connect together a pair of axially spaced grooves, formed in the valve bore, when said valve member moves to it "open" position.

In another arrangement the by-pass valve member, which is urged to its "open" position by the liquid when the pressure of the latter exceeds a predetermined value, is connected in series with an adjustable constriction acting to limit the rate at which the liquid by-passes the slave unit or units, said adjustable constriction conveniently comprising a needle valve member.

Figure 2:
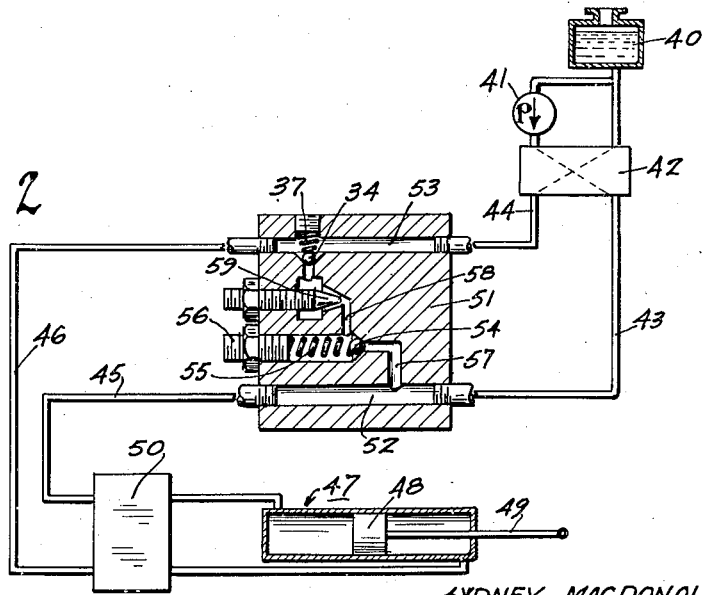

The invention is illustrated by way of example in the accompanying drawing, in which:

Figure 1 is a sectional side elevation of the preferred form of valve device, for incorporation in a double-acting remote control system, the component parts of the system being indicated diagrammatically to a reduced scale; and Figure 2 is a similar view showing diagrammatically a modified construction of valve device.

Referring to Figure 1, the valve device comprises a body 10 which is formed with a bore 11 adapted to receive a sleeve 12 held in position by a union 13. The sleeve 12 is bored axially to form a Venturi-shaped passage 14 having a throat portion 15, one or more small radial holes 16 being adapted to connect said throat portion with a circumferential groove 17. The latter communicates, by way of a passage 18, with a working space 19 at one end of a cylindrical bore 20 containing an axially slidable piston valve member 21. This member is urged towards the right by a coiled compression spring 22, which latter abuts against a flanged thrust member 23 supported adjustably by a screw 24 adapted to regulate the force exerted by the spring 22, the setting being locked by a nut 25 and cap 26. The opposite end of the bore 20 is closed by a screw-threaded plug 27 so as to form a working space 28, which latter communicates by an oblique passage 29 with a connection 30 leading to the Venturi-shaped passage 14. The cylinder bore 20 is formed with two axially spaced circumferential grooves 31 and 32, of which the former is joined to the connection 30 by a bore 33, while the latter groove communicates by way of a non-return ball valve 34 with two connections indicated at 35 and 36. The ball valve 34 is held in its closed position by a coiled compression spring 37 abutting at its outer end against a plug 38. The valve member 21 is formed intermediate its ends with an annular groove 39, which is adapted as shown to bridge the two grooves 31 and 32 in the bore 20 when the valve member 21 assumes its "open" position, but when said valve member is in its "closed" position it rests against the plug 27 so that the groove 39 communicates only with the groove 31.

The valve device is connected in the remote control system as shown in Figure 1 and is arranged primarily to control the "down" movement of an aircraft flap, the arrangement being such that the flap moves with the requisite speed when the aircraft engine is rotating at its slowest rate, but said flap is prevented from moving downwards at an excessive speed if the engine is running fast. A reservoir 40 feeds an engine-driven pump 41, which latter delivers pressure liquid by way of a reversible selector valve 42 to either one of a pair of pipe lines 43 and 44, leading respectively to connections 30 and 36 in the valve body 10. The union 13 and the connection 35 are joined by pipe lines 45 and 46 respectively with a double-acting slave unit 47 having a piston 48 and piston rod 49, a hydraulic locking valve device of the known type being incorporated in the pipe lines and being indicated at 50.

When the selector valve 42 is actuated so that pressure liquid is delivered through the pipe line 43, said liquid passes through the Venturi-shaped passage 14 and, reaching the upper part of the slave unit 47, it forces the piston 48 downwards so as to lower the flap (not shown) of an aircraft. The pressure of the liquid in the connection 30 of the valve device is exerted upon the right-hand end of the piston valve member 21, while the reduced pressure which occurs at the throat portion 15 of the Venturi-shaped passage is similarly free to act upon the left-hand end of said valve member 21. The spring 22 acts to hold the valve member 21 in its "closed" position, but when the rate of flow through the Venturi-shaped passage 14 exceeds a predetermined value the drop in pressure at the throat portion becomes so great that the liquid in the connection 30 is able to overcome the spring 22 and move the valve member 21 towards its "open" position, the extent of opening depending of course upon the difference of the pressures in the working spaces 28 and 19. It will thus be seen that in these circumstances part of the output from the pump 41 is able to pass through the passageway 33, open the non-return valve 34 and thus return to the inlet of the pump 41. The provision of the Venturi-shaped passage 14 enables the valve device to operate satisfactorily almost irrespective of the pressure at which the liquid is delivered, since the opening of the valve member 21 depends primarily upon the volumetric rate of flow through said Venturi-shaped passage 14. The Venturi-shaped passage 14 is made as smooth and streamline as possible so that the liquid, after leaving the throat portion 15, returns to substantially the pressure existing in the connection 30, thus rendering the device efficient in operation and avoiding unnecessary heating of the working liquid.

A simpler but less efficient form of valve device is shown diagrammatically in Figure 2, and comprises a body 51. The pipe line 43 from the selector valve 42 is joined to an ordinary passageway 52 extending through the body 51 and connected at its opposite end with the pipe line 45 leading to the slave cylinder unit 47. A pipe line 46 is provided as before and leads to another passageway 53, which passes through the body 51 and is joined at its other end to the pipe line 44. A ball valve 54 is relatively heavily loaded onto its seat by a coiled compression spring 55, which latter abuts at its outer end against an adjustable screw 56 so that the pressure at which the valve 54 opens can be regulated. The valve 54 is connected by a passage 57 with the passageway 52, while a passage 58 leads past a needle valve 59 and a non-return valve 34, to the passageway 53. The needle valve 59 is screw-threaded into the body 51 so as to constitute a fixed but adjustable constriction in the passage 58, thus limiting the extent to which the pressure liquid can flow past the spring loaded valve 54. When the pump 41 is driven fast the pressure as well as the volumetric output increases, and there would therefore be a tendency for the slave cylinder unit 47 to be operated faster. The increase in pressure, however, acting in the passage 57, has the effect of opening the ball valve 54 against the force of the spring 55 so that a part of the pump delivery is allowed to return to the inlet of the pump by way of the needle valve 59 and the non-return valve 34.

It will be observed that each of the valve devices illustrated only exerts a controlling influence when the slave unit is being operated in one direction, the by-passing of the liquid when the system is working in the opposite direction being prevented by the non-return ball valve 34. If it is desired, however, to secure a regulating effect in both directions of operation, two valve devices can be included in the system, these being connected in opposite senses between the pipe lines 43 and 44.

It will be appreciated that the invention is not limited to the forms of valve device described, and that various other arrangements can be utilised so as to secure the desired limitation of the rate of flow and/or liquid pressure in the remote control system.

What I claim is:

1. In a by-pass valve having a Venturi-shaped passage, a chamber, a piston element movable therein, a connection between the throat portion of the venturi and the chamber on one side of the piston, and a connection between the mouth of the venturi and the chamber on the other side of the piston, the movements of said piston being controlled by the rate of flow of liquid through the Venturi-shaped passage and the movements of said piston operating to control the escape of fluid from the passage.

2. A combination of a pump with a flow control device comprising a valve body having a Venturi-shaped passage therein and a chamber therein and having openings connecting the throat portion of the venturi to the chamber and separately connecting the passage adjacent the mouth of the venturi to the chamber, a piston reciprocable in the chamber having one end thereof subjected to the pressure prevailing at the throat portion of the venturi and the other end thereof subjected to the pressure prevailing at the mouth portion of the venturi.

3. A combination of a pump with a flow control device comprising a valve body having a Venturi-shaped passage therein and a chamber therein and having openings connecting the throat portion of the venturi to the chamber and separately connecting the passage adjacent the mouth of the venturi to the chamber, a piston reciprocable in the chamber having one end thereof subjected to the pressure prevailing at the throat portion of the venturi and the other end thereof subjected to the pressure prevailing at the mouth portion of the venturi, and a spring for exerting pressure against one end of the piston.

4. A liquid pressure system comprising a pump arranged to deliver pressure liquid, an element having a Venturi-shaped passage therein, a by-pass valve device having a bore therein and having a piston valve member which is axially slidable within the bore and which is moved to its opened position by the pressure of the liquid being delivered by the pump, wherein the by-pass valve comprises a piston valve member which is axially slidable within a bore having both ends closed to form working spaces, one of said spaces being connected with the throat portion of the Venturi-shaped passage and the other with the delivery passage of the pump between the latter and the Venturi-shaped passage, both ends of the valve member subject to liquid pressure being equal in area, and a coiled compression spring disposed within that working space connected with the throat portion of the Venturi-shaped passage and normally holding the valve member in its closed position, the drop in pressure at the throat portion of the Venturi-shaped passage necessary to open the valve thus being entirely dependent upon the force exerted by the spring.

5. The combination of a valve body having a passageway with different cross-sectional diameters, a chamber therein and passages connecting the passageway with the chamber, with a piston reciprocable in the chamber, one of said passages connecting a larger diameter of said passageway with the chamber on one side of the piston, and another of said passages connecting a smaller diameter portion of the passageway with the chamber on the other side of the piston.

6. The combination of a valve body having a passageway with different cross-sectional diameters, a chamber therein and passages connecting the passageway with the chamber, with a piston reciprocable in the chamber, one of said passages connecting a larger diameter of said passageway with the chamber on one side of the piston, another of said passages connecting a smaller diameter portion of the passageway with the chamber on the other side of the piston, and a third passage connecting the passageway to the chamber at a point intermediate the ends of the piston.

7. In combination, a pump, a by-pass for at times connecting the outlet to the inlet side of the pump, a piston for controlling the by-pass and means for causing differential pressures to be exerted on opposite ends of the piston depending upon the rate of flow of fluid delivered by the pump.

SYDNEY MACDONALD PARKER.